(12) United States Patent  (10) Patent No.: US 8,398,087 B2
Nishimura et al.  (45) Date of Patent: Mar. 19, 2013

(54) BONDED PISTON SEAL

(75) Inventors: Tomoaki Nishimura, Fukushima (JP);
Yoshiyuki Kanzaki, Shizuoka (JP);
Kiyofumi Fukasawa, Kanagawa (JP);
Katsumi Abe, Kanagawa (JP)

(73) Assignee: NOK Corporation, Tokyo (JP)

( * ) Notice: Subject to any disclaimer, the term of this patent is extended or adjusted under 35 U.S.C. 154(b) by 45 days.

(21) Appl. No.: 12/310,383

(22) PCT Filed: Aug. 8, 2007

(86) PCT No.: PCT/JP2007/065498
§ 371 (c)(1),
(2), (4) Date: Feb. 23, 2009

(87) PCT Pub. No.: WO2008/023568
PCT Pub. Date: Feb. 28, 2008

(65) Prior Publication Data
US 2009/0283972 A1 Nov. 19, 2009

(30) Foreign Application Priority Data
Aug. 22, 2006 (JP) ................................. 2006-224935

(51) Int. Cl.
*F16J 9/20* (2006.01)
(52) U.S. Cl. ......... 277/439; 277/438; 428/457; 428/343
(58) Field of Classification Search .................. 277/442, 277/439, 438; 428/457, 343
See application file for complete search history.

(56) References Cited

U.S. PATENT DOCUMENTS

| 3,256,368 A | * | 6/1966 | Burhans et al. | 525/145 |
| 4,160,757 A | * | 7/1979 | Honda et al. | 524/432 |
| 4,537,805 A | * | 8/1985 | Lin | 427/516 |
| 4,931,509 A | * | 6/1990 | Yagishita et al. | 525/208 |

(Continued)

FOREIGN PATENT DOCUMENTS

| JP | 63-088339 | 4/1988 |
| JP | 11-257374 | 9/1999 |

(Continued)

OTHER PUBLICATIONS

"Novolak (Novolac)." Cure Terms Glossary. Polymatrix: Innovative Tools for Polymers. http://polymatrix.co.uk/Assets/Cure/%20Terms%20Glossary/Novolak.htm, Accessed Mar. 23, 2011.*

(Continued)

*Primary Examiner* — Vishal Patel
*Assistant Examiner* — Eugene G Byrd
(74) *Attorney, Agent, or Firm* — Brinks Hofer Gilson & Lione

(57) ABSTRACT

A bonded piston seal, which comprises a metal ring, and a rubbery elastomer seal as vulcanization-bonded thereto expect the sliding site along which a mating seal member slides, where the rubbery elastomer seal is partially bonded to the metal ring through an adhesive layer, wherein the adhesive layers comprises (a) an underlayer adhesive layer comprising a phenol resin and an epoxy resin, and (b) an overlayer adhesive layer comprising a phenol resin, a halogenated polymer, and a metal oxide. Not only the distinguished initial adhesiveness, but also the distinguished water-resistance can be obtained by providing (a) the underlayer adhesive layer of the afore-mentioned components and (b) the overlayer adhesive layer of the afore-mentioned components.

9 Claims, 1 Drawing Sheet

U.S. PATENT DOCUMENTS

| | | | |
|---|---|---|---|
| 5,093,203 A * | 3/1992 | Mowrey et al. | 428/462 |
| 5,200,455 A * | 4/1993 | Warren | 524/413 |
| 5,268,404 A * | 12/1993 | Mowrey | 524/236 |
| 5,344,881 A * | 9/1994 | Yamamoto et al. | 525/112 |
| 5,346,957 A * | 9/1994 | Tsuji et al. | 525/122 |
| 5,354,805 A * | 10/1994 | Treat et al. | 524/510 |
| 6,627,691 B2 * | 9/2003 | Mowrey et al. | 524/492 |
| 6,841,600 B2 * | 1/2005 | Green et al. | 524/259 |
| 6,902,766 B1 * | 6/2005 | Kucera | 427/372.2 |
| 7,671,582 B2 * | 3/2010 | Yabe et al. | 324/174 |
| 2004/0033374 A1 * | 2/2004 | Mowrey | 428/457 |
| 2005/0101725 A1 * | 5/2005 | Carney | 524/594 |
| 2007/0292703 A1 * | 12/2007 | Ikuta et al. | 428/494 |
| 2008/0115888 A1 * | 5/2008 | Husemann et al. | 156/307.5 |
| 2009/0014965 A1 * | 1/2009 | Kudo et al. | 277/591 |
| 2009/0311543 A1 * | 12/2009 | Abe et al. | 428/457 |

FOREIGN PATENT DOCUMENTS

| | | |
|---|---|---|
| JP | 2002-139155 | 5/2002 |
| JP | 2003-056717 | 2/2003 |
| JP | 2006-029373 | 2/2006 |

OTHER PUBLICATIONS

"Resole." Cure Terms Glossary. Polymatrix: Innovative Tools for Polymers. http://polymatrix.co.uk/Assets/Cure/%20Terms%20Glossary/Resole.htm, Accessed Mar. 23, 2011.*

* cited by examiner

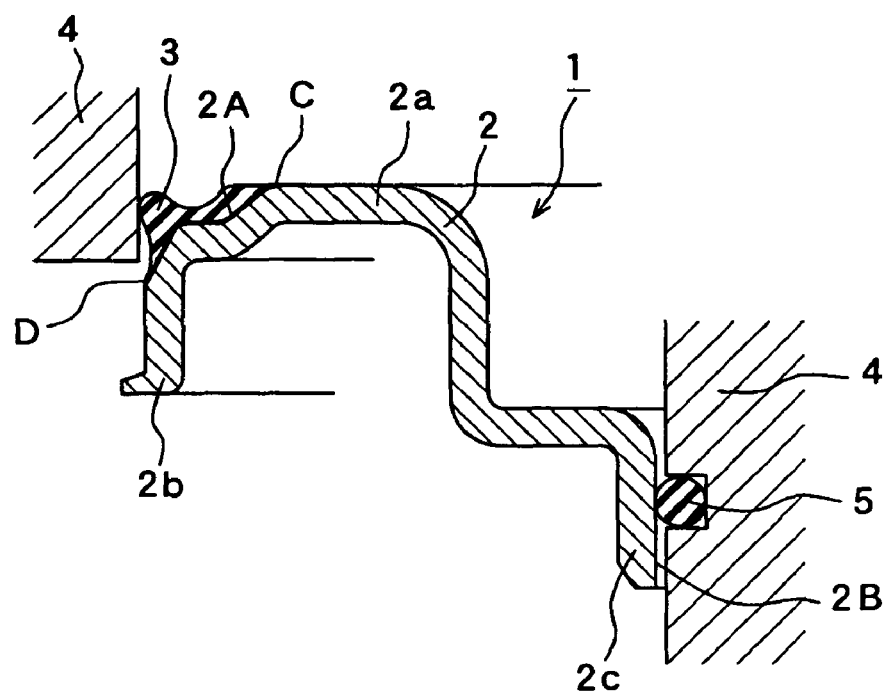

BONDED PISTON SEAL

RELATED APPLICATIONS

The present application is a 35 U.S.C. §371 national stage filing of International Patent Application No. PCT/JP2007/065498, filed Aug. 8, 2007, to which priority is claimed under 35 U.S.C. §120 and through which priority is claimed under 35 U.S.C. §119 to Japanese Priority Patent Application No. 2006-224935, filed Aug. 22, 2006.

TECHNICAL FIELD

The present invention relates to a bonded piston seal, and more particularly to a bonded piston seal of rubber lip vulcanization-bonded type for use in clutch connection inside the automatic transmissions of vehicles such as automobiles, etc.

BACKGROUND ART

Bonded piston seal (BPS, including piston seals, balance dams, drum seals, etc.) of rubber lip vulcanization-bonded type for use in clutch connection inside automatic transmissions (AT) of vehicles such as automobiles, etc. generally comprises a metal ring undergoing oil-hydraulic working (reciprocal motions) inside the automatic transmissions and a rubbery elastomer seal vulcanization-bonded to the metal ring, where the metal ring typically has a bonding site for vulcanization-bonding the rubbery seal, and also a sliding site along which a mating seal member (such as O ring, a rubber lip, or the like, as provided on the AT housing side).
Patent Literature 1: JP-A-2002-139155

An adhesive is used to vulcanization-bond the seal to the metal ring. The adhesive has a rust-preventive effect on the metal ring when laid thereon, so the adhesive is generally applied by "full dipping" and thus applied to the entire exposed surface of the ring except the bonding site.

However, from the viewpoint of the working characteristics of bonded piston seal is regarded as important, on the other hand, fluctuations (i.e. instability) in the frictional resistance caused by sliding along the mating seal member must be suppressed, and thus the adhesive layer formed on the sliding site, which is a cause for the fluctuations, must be removed by cutting. This cutting removal step has been so far carried out as one step of the process.

The step of removing the adhesive layer can be carried out specifically by cutting work, where the surface roughness must be smaller to suppress the abrasion of the mating seal member, and furthermore a higher dimensional precision is required for cutting to suppress the fluctuations in contact state (contact interference) of the mating seal member, so the cutting work requires much time and labor, resulting in a problem of higher processing cost than usual.

Furthermore, the cutting work is carried out as the final step following the step of adhesive application and the step of vulcanization molding, so prevention of rubber seal from any damages by chips, removal of attached foreign matters by washing, and necessary inspection for quality confirmation, etc. are required for the seal security, resulting in much more time and labor. This is a problem of increased cost.

Besides the afore-mentioned type of bonded piston seal provided the bonding site and the sliding site on a metal ring, the bonded piston seal has another type of bonding sites provided on both inside and outside peripheries of a metal ring (type of vulcanization-bonded seals on both inside and outside peripheries of a metal ring), or a further type of a bonding site provided only on one of inside or outside peripheries of a metal ring (type of a vulcanization-bonded seal on one of inside or outside peripheries of a metal ring and a sliding site provided on the other periphery or not, and this type can be used often particularly as a balance dam). When the adhesive is applied to the metal ring by full dipping, irrespective of the type, the amount of the adhesive as used is inevitably increased. An organic solvent is used in the most of adhesives, so the evaporative scattering of the solvent would cause an environmental problem.
Patent Literature 2: JP-A-2003-56717
Patent Literature 3: JP-A-11-257374

DISCLOSURE OF THE INVENTION

Problem to be Solved by the Invention

In a bonded piston seal comprising a metal ring and a required number of rubbery elastomer seals, as vulcanization-bonded to the metal ring, the present applicant has so far proposed partial application of an adhesive only to part of the metal ring including the bonding site at the time of vulcanization-bonding of the seal. By the proposed process for producing a bonded piston seal it is capable of not only suppressing the amount of the adhesive used to a minimum, thereby contributing to environmental conservation, but also omitting the expensive cutting work requiring much time and labor from the process for producing a bonded piston seal comprising a metal ring and a seal, thereby solving the afore-mentioned problems due to the cutting work beforehand.
Patent Literature 4: JP-A-2006-29373

The proposed partial application has such an advantage as omission of the cutting step for the sliding site after vulcanization as a result of partial application of the adhesive on one hand, but has such a problem of decreased water-resistant adhesiveness as a result of omission of underlayer phosphate film treatment from the conventional process for adhesive treatment comprising a surface treatment by underlayer phosphate film and a full dipping treatment of an adhesive, on the other hand. The surface treatment by underlayer phosphate film can be carried out by full dipping, and its partial surface treatment is impossible to conduct, resulting in occurrence of such a problem.

The object of the present invention is to provide a bonded piston seal, which comprises a metal ring and a rubbery elastomer seal as vulcanization-bonded thereto except the sliding site along which a mating seal member can slide, where the rubbery elastomer seal is partially bonded to the metal ring through an adhesive layer having a distinguished water-resistant adhesiveness.

Means for Solving the Problem

The object of the present invention can be attained by the adhesive layers, which comprise (a) an underlayer adhesive layer comprising a phenol resin and an epoxy resin, and (b) an overlayer adhesive layer comprising a phenol resin, a halogenated polymer, and a metal oxide.

Effect of the Invention

Partial bonding of a required number of rubbery elastomer seals by an adhesive to a metal ring except the sliding site along which the mating seal member can slide, can unnecessiate the step of removing the adhesive layer by cutting from the sliding surface for the mating seal member after the vulcanization bonding. In the case of partial application of an adhesive, the decreased water-resistance resulting from the omission of the conventional phosphate film treatment step, which can ensure rust-prevention and water-resistance, is a problem, but not only distinguished initial adhesiveness, but also good water-resistance can be obtained by providing (a) an underlayer adhesive layer of the afore-mentioned components and (b) an overlayer adhesive layer of afore-mentioned components. Furthermore, the present invention can be applied to sites requiring some surface roughness without any restriction.

The adhesive layers generally has a thickness of about 30 µm at the maximum, thereby causing fluctuations in the dimensional tolerance of the entire bonded piston in correspondence to the thickness level. Tolerance may sometimes have some influence on the distance to the mating member, but the partial bonding can make the dimensional tolerance of a metal ring equal to that of the part, contributing to easiness of product design, that is, dimensional stability of products and effective prevention of interferences, etc. from the mating member.

BRIEF DESCRIPTION OF DRAWING

FIG. 1 is a cross-sectional view of the essential part according to one embodiment of the present bonded piston seal.

DESCRIPTION OF REFERENCE NUMERALS

| | |
|---|---|
| 1 | bonded piston seal |
| 2 | metal ring |
| 2a | edge surface |
| 2b | outer peripheral cylinder part |
| 2c | inner peripheral cylinder part |
| 2A | bonding site |
| 2B | sliding site |
| 3 | rubber lip (seal) |
| 4 | housing |
| 5 | O ring (mating seal member) |

BEST MODES FOR CARRYING OUT THE INVENTION

One embodiment of the present invention will be described, referring to the drawing. FIG. 1 shows a cross-sectional view of the essential part of bonded piston seal 1 according to the present invention.

Bonded piston seal 1 is assembled into AT housing 4 together with a clutch plate, a return spring, etc., not shown in the drawing, and has metal ring 2 working as a piston for pressing the clutch plate by oil-hydraulic working. Rubber lip 3, which is a rubbery elastomer seal in a slidably tight contact with the inside surface of AT housing 4, is vulcanization-bonded to the outer periphery of surface of metal ring 2 to seal the outer periphery of metal ring 2. Metal ring 2 is constructed to slide over O ring 5, which is a mating seal member provided at AT housing 4, to seal the inner periphery of metal ring 2. Thus, metal ring 2 has bonding site 2A for vulcanization-bonding rubber lip 3, and sliding site 2B for sliding over O ring 4. In the embodiment as shown in the drawing, the outer peripheral shoulder extending from edge surface 2a of metal ring 2 to outer peripheral cylinder 2b is made to act as bonding site 2A, whereas the inner peripheral surface of inner peripheral cylinder 2c of metal ring 2 is made to act as sliding site 2B. Metal ring 2 can be fabricated into a cross-sectional shape as shown in the drawing by plate press work.

When rubber lip 3 is to be vulcanization-bonded to metal ring 2, "partial application" of an adhesive not to the entire surface of metal ring 2, but only to part thereof is carried out. In the practice of "partial application", the adhesive is applied only to the part including bonding site 2A except sliding site 2B (i.e. the part including bonding site 2A and excluding sliding site 2B). In the embodiment as shown in the drawing, the adhesive is annularly applied only to bonding site 2A, i.e. a zone extending from point C to point D on the outer peripheral shoulder as shown in the drawing.

In the practice of "partial application" of the adhesive limited only to the rubber vulcanization-bonding site of the metal ring in contrast to the conventional art of "full dipping" of the entire surface of the metal ring, the partial application range can be set to fully cover at least an extent for vulcanization-bonding the rubbery elastomer seal as a basis, without any application to the sliding site. A spray system by a precision nozzle is suitable for the partial application of the adhesive, but any other systems of capacitance type, etc. can be also used. In the practice of such a "partial application" of the adhesive, the sliding site can never undergo deposition of the adhesive even from the beginning, unnecessitating the cutting step for the seal sliding site after the rubber vulcanization molding, resulting in considerable cost reduction.

The "partial application" of the adhesive can reduce the amount of the adhesive to be used, and can omit the costly and much labor cutting work after the rubber vulcanization molding, because there is no deposition of the adhesive to be removed from siding site 2B of metal ring 2 even from the beginning. Thus, the present invention can considerably reduce both labor and cost of processing, and also can overcome problems connected to the cutting work beforehand.

In the case seal 3 is each provided on inner and outer peripheries, the afore-mentioned partial application of the adhesive can be made each to bonding sites 2A. That is, the bonded piston seal includes other types, such as a type of bonding sites 2A provided each on the inner and outer peripheries of metal ring 2 (i.e. a type of seal 3 vulcanization-bonded each to the inner and outer peripheries of metal ring 2), and a type of bonding site 2A provided on only one of the inner or outer peripheries of metal ring 2 (i.e. a type of seal 3 vulcanization-bonded to only one of the inner or outer peripheries of metal ring 2, with no siding site being provided), besides the afore-mentioned type of bonding site 2A and sliding site 2B provided on metal ring 2, and the present invention can be also applied to these other types. That is, in the case of seal 3 vulcanization-bonded each to the inner and outer peripheries of metal ring 2, bonding site 2A is provided each on the inner and outer peripheries, and thus partial application of the adhesive can be carried out to parts of surfaces of metal ring 2 covering bonding sites 2A on the inner and outer peripheries. In the case of seal 3 vulcanization-bonded to only one of the inner or outer peripheries of metal ring 2, bonding site 2A is provided on only one thereof, and thus partial application of the adhesive can be carried out to part of the surface of metal ring 2 covering only one bonding site 2A.

The partially applied adhesive layer comprises (a) an underlayer adhesive layer and (b) an overlayer adhesive layer, and the adhesive layers can be applied to various metals without any chemical conversion treatment such as zinc phosphate treatment, etc., where the metals include, for example, mild steel, stainless steel, aluminum, aluminum die cast, etc. Hot rolled steel such as SAPH, SPFH, etc., and cold rolled steel such as SPCC, etc. are preferable for the metal ring of bonded piston seal. Acrylic rubber, fluororubber, hydrogenated nitrile rubber, ethylene acrylate rubber, etc. can be vulcanization-bonded to the adhesive layers to form a rubber lip, and acrylic rubber is preferable among them.

Such underlaying adhesives containing phenol resin and epoxy resin, can be used as Metalock PH-50, a product of Toyo Kagaku Kenkyusho, a vulcanizable adhesive composition, which comprises a novolak type epoxy resin, a novolak type phenol resin derived from p-substituted phenol, and an imidazole compound as a curing catalyst, as disclosed in Japanese Patent No. 2,870,118, specifically a vulcanizable adhesive composition, which comprises 100 parts by weight of a novolak type epoxy resin, about 30 to about 60 parts by weight of a novolak type phenol resin derived from p-substituted phenol, and having a melting point of about 100° to about 150° C. and a molecular weight of about 1000, and about 0.1 to about 5 parts by weight of an imidazole compound such as 2-methylimidazole, 2-ethyl-4-methylimidazole, 2-undecylimidazole, 2-heptadecylimidazole, 2-phenylimidazole, 1-benzylimidazole, 1-benzyl-2-methylimidazole 2,4-diamino-6-[2-methylimidazoline-(1)]-ethyl-s-triazine, etc. These compositions can be used as such or upon preparation of a solution in an organic solvent capable of dissolving or dispersing the components.

Phenol resin for use in the overlaying adhesive includes a novolak-type phenol resin and a resol-type phenol. To secure the reactivity with acrylic rubber, it is preferable to use these two types of phenol resins together at the same time, and more preferable to use a blend comprising 50-90 wt. % of novolak-type phenol resin and 50-10 wt. % of resol-type phenol resin.

Novolak-type phenol resin can be obtained by reaction of phenols with formaldehyde in a molar ratio at about 0.1 to about 1.0 in the presence of an acid catalyst such as hydrochloric acid, oxalic acid, etc., whereas resol-type phenol resin can be obtained by condensation reaction of phenols with formaldehyde in a molar ratio of about 1 to about 3 in the presence of an alkali catalyst such as ammonia, hydroxide of alkali metal or magnesium, etc., where any one of phenols can be used, so long as phenols have 2 or 3 substitutable nuclear hydrogen atoms at o-, p-, or o- and p-positions with respect to the phenolic hydroxyl group, such as phenol, m-cresol, p-cresol, p-t-butyl phenol, p-phenyl phenol, bisphenol A, etc.

Halogenated polymer for use in the overlaying adhesive includes, for example, dichlorobutadiene polymer, brominated dichlorobutadiene polymer, chlorinated polychloroprene, chlorinated rubber, etc.

Metal oxide for use in the overlaying adhesive includes, for example, titanium oxide, or a divalent metal oxide having an acid-accepting effect such as zinc oxide, magnesium oxide, calcium oxide, etc., and mixtures of titanium oxide or these metal oxides, preferably a mixture of titanium oxide and the divalent metal oxide.

The afore-mentioned essential components for use in the overlaying adhesive can be used in proportions of 45-75 wt. %, preferably 55-70 wt. %, of phenol resin, 5-25 wt. %, preferably 8-20 wt. %, of halogenated polymer, and 10-30 wt. %, preferably 13-29 wt. %, of metal oxide, on the basis of overlaying adhesive solid matters. When the halogenated polymer is used in a proportion of more than 25 wt. %, bonding to acrylic rubber will be unsatisfactory, whereas when used in a proportion of less than 5 wt. %, bonding to a metal substrate will be unsatisfactory, leading to peeling, and thus these are unpreferable. When the metal oxide is used in a proportion of more than 30 wt. %, the solution thus prepared will be unstable, and the bonding to acrylic rubber, etc. will be unsatisfactory, whereas when used in a proportion of less than 10 wt. % the bonding to acrylic rubber, etc. will be unsatisfactory and thus these are unpreferable.

The overlaying vulcanization adhesive composition comprising the afore-mentioned essential components can be used as a solution upon dilution with an organic solvent to a concentration of about 3 to about 20 wt. % as a sum total of solid matters of theses essential components. The organic solvent is not particularly limited, so long as the phenol resins, halogenated polymers, and the metal oxide can be stably dissolved or dispersed therein. Such organic solvent generally includes alcohols such as methanol, isopropanol, etc., ketones such as methyl ethyl ketone, methyl isobutyl ketone, etc., esters such as ethyl acetate, propyl acetate, etc., and ethers such as ethyl cellosolve, 2-ethoxyethanol, 2-butoxyethanol, etc.

Bonded piston seal can be prepared by applying as underlaying adhesive to the rubber-bonding site on the metal surface of desired shape to a film thickness of about 1 to about 30 μm by any one of spraying, dipping, brush coating, roll coating, etc., followed by drying of room temperature or with hot air, and then by baking at about 100° to about 250° C. for about 0.1 to about 2 hours to form an underlayer adhesive layer, and then by forming an overlayer adhesive in the same manner of application, application temperature and time as in the case of forming the underlayer adhesive, and then by joining an acrylic rubber compound, etc. to the surface of the adhesive layers, followed by press vulcanization at about 180° to about 230° C. for about 2 to about 20 minutes to form a rubber lip of acrylic rubber layer, etc. in a film thickness of about 0.5 to about 10 mm.

Unvulcanized acrylic rubber compound for use herein includes an acrylic compounds having any vulcanizable group such as active chlorine, epoxy group, carboxyl group, etc. as a vulcanization site, for example, a compound of the following Formulation example:

| (Formulation example of acrylic rubber compound) | |
|---|---|
| | Parts by weight |
| Active chlorine-containing acrylic rubber | 100 |
| HAF carbon black | 70 |
| Silica powder | 5 |
| Microcrystalline wax (Sunnock, a product of Ouchi-Shinko Kagaku Co.) | 2 |
| Stearic acid | 1 |
| 4,4'-bis(2,2'-dimethylbenzyl) diphenylamine | 2 |
| Sulfur | 0.3 |
| Sodium stearate | 3.5 |

The acrylic rubber having a vulcanizable group for use herein typically includes acrylic rubber copolymers comprising an alkyl acrylate having an alkyl group of 1-8 carbon atoms and/or and alkoxyalkyl acrylate having an alkoxyalkylene group of 2-8 carbon atoms as the major component, and about 0.1 to about 10 wt. %, preferably about 1 to about 5 wt. %, of a vulcanizable group-containing monomer, as copolymerized therewith, for example:

(a) Reactive halogen-containing vinyl monomer such as 2-chloroethyl vinyl ether, vinyl chloroacetate, allyl chloroacetate, or reaction products of glycidyl compounds such as glycidyl (meth)acrylate, allyl glycidyl ester, etc. with monochloroacetic acid, etc.

(b) Epoxy group-containing vinyl monomer such as the afore-mentioned glycidyl compounds, etc.

(c) Carboxyl group-containing vinyl monomer such as (meth)acrylic acid, maleic acid mono lower alkyl esters, fumaric acid mono lower alkyl esters, etc.

(d) Hydroxyl group-containing vinyl monomer such as 2-hydroxyethyl acrylate, etc.

(e) Amido group-containing vinyl monomer, (f) Dienic monomer, etc.

A vulcanizing agent can be used, depending on the species of the vulcanizable groups.

EXAMPLES

The effects of the present invention will be described in detail below, referring to Examples.

Reference Example 1

| | Part by weight |
|---|---|
| Phenol resin/epoxy resin-based adhesive (Metalock PH-50) | 100 |
| Methyl ethyl ketone | 200 |

An underlaying adhesive solution prepared from the foregoing components was applied to a defatted cold-rolled steel sheet surface to a thickness of 5 μm, followed by drying at room temperature and baking at 200° C. for 10 mininutes to form an underlayer adhesive layer.

Next,

| | Parts by weight |
|---|---|
| Novolak type phenol resin (Resitop PSF-2803, a product of Gun-Ei Chemical Co.) | 60 |
| Resol type phenol resin (Resitop PL-2208, a product of Gun-Ei Chemical Co.; solid matters concentration: 63%) | 63.5 (40; in terms of solid matters) |
| Chlorinated rubber (CAS No. 9006-03-5) | 25 |
| Zinc oxide | 20 |
| Titanium oxide | 20 |
| Methyl isobutyl ketone | 1461.5 |

An overlaying adhesive solution prepared from the foregoing components was applied to the surface of the underlayer adhesive layer formed on the steel sheet to a thickness of 10 μm, followed by drying at room temperature and baking at 150° C. for 15 minutes.

Unvulcanized acrylic rubber compound of the afore-mentioned Formulation example was joined to the resulting adhesive layer on the steel sheet, and subjected to press vulcanization at 200° C. for 5 minutes. The resulting bonded sheet was subjected to 900 peeling tests according to JIS-K 6256 corresponding to ASTM D429-03, where the initial adhesiveness or the hot water-resistant adhesiveness by dipping in hot water at 80° C. for 70 hours were investigated by determining percent retained rubber areas and specifying peeled boundary sites. Results show that the percent retained rubber area was 100% in both cases of initial and hot water-dipping tests, and thus both of the initial adhesiveness and the hot water-resistant adhesiveness were found satisfactory. Also in the specification of peeled boundary sites, no peeled boundary sites were observed at all both between the steel sheet and the adhesive layer and between the adhesive layer and the acrylic rubber layer.

Reference Example 2

In Reference Example 1, the amount of chlorinated rubber and that of methyl isobutyl ketone of the overlaying adhesive composition were changed to 15 parts by weight and 1371.5 parts by weight, respectively. In both cases of the initial and hot water dipping tests conducted in the same manner as in Reference Example 1, the percent retained rubber area was found 100%. In the specification of peeled boundary sites of initial and dipping tests, no peeled boundary sites were found at all both between the steel sheet and the adhesive layer and between the adhesive layer and the acrylic rubber layer in both tests.

Reference Example 3

In Reference Example 1, the amount of chlorinated rubber and that of methyl isobutyl ketone of the overlaying adhesive composition were changed to 35 parts by weight and 1551.5 parts by weight, respectively. In both cases of the initial and hot water dipping tests conducted in the same manner as in Reference Example 1, the percent retained rubber area was found 100%. In the specification of peeled boundary sites of initial and dipping tests, no peeled boundary sites were found at all both between the steel sheet and the adhesive layer and between the adhesive layer and the acrylic rubber layer in both tests.

Reference Example 4

In Reference Example 1, the amount of zinc oxide and that of titanium oxide of the overlaying adhesive composition were each changed to 10 parts by weight, and that of methyl isobutyl ketone was changed to 1281.5 parts by weight. In both cases of the initial and hot water dipping tests conducted in the same manner as in Reference Example 1, the percent retained rubber area was found 100%. In the specification of peeled boundary sites of initial and dipping tests, no peeled boundary sites were found at all both between the steel sheet and the adhesive layer and between the adhesive layer and the acrylic rubber layer in both tests.

Reference Example 5

In Reference Example 1, the amount of zinc oxide and that of titanium oxide of the overlaying adhesive composition were each changed to 25 parts by weight, and that of methyl isobutyl ketone was changed to 1551.5 parts by weight. In both cases of the initial and hot water dipping tests conducted in the same manner as in Reference Example 1, the percent retained rubber area was found 100%. In the specification of peeled boundary sites of initial and dipping tests, no peeled boundary sites were found at all both between the steel sheet and the adhesive layer and between the adhesive layer and the acrylic rubber layer in both tests.

Comparative Example 1

In Reference Example 1, no chlorinated rubber was used, and the amount of methyl isobutyl ketone was changed to 1236.5 parts by weight in the overlaying adhesive composition. Percent retained rubber area in the initial test was found 100%, but in the hot water dipping test, peeling took place between the steel sheet and the underlayer adhesive layer, so the percent retained rubber area was found 80%.

Comparative Example 2

In Reference Example 1, neither zinc oxide nor titanium oxide was used, and the amount of methyl isobutyl ketone was changed to 1,101.5 parts by weight in the overlaying adhesive composition. Percent retained rubber area in the initial and hot water dipping tests was found 70% and 60%, respectively, and peeling took place between the acrylic rubber layer and the overlayer adhesive layer in both tests.

Comparative Example 3

In Reference Example 1, no underlaying adhesive was used at all. The percent retained rubber area in the initial test was found 100%, but in the hot water dipping test peeling took place between the steel sheet and the adhesive layer, and the percent retained rubber area was found 0%.

Example

A bonded piston seal as shown in FIG. 1 was fabricated. That is, an overlayer adhesive layer and an underlayer adhesive layer of the afore-mentioned Reference Example 1 were formed on a hot rolled or cold rolled metal ring of desired shape, and then a rubber lip was formed thereon by vulcanization bonding of unvulcanized acrylic rubber compound of the afore-mentioned Formulation example, according to Reference Example 1. The initial adhesiveness and the hot water-resistant adhesiveness were as shown in the Reference example.

The invention claimed is:

1. A bonded piston seal, which comprises:
   a metal ring; and
   an acrylic rubber copolymer comprising at least one of i) an alkyl acrylate having an alkyl group of 1-8 carbon atoms; and ii) an alkoxyalkyl acrylate having an alkoxyalkylene group of 2-8 carbon atoms as a major component, and 0.1 to 10 Wt. % of a vulcanizable group-containing monomer consisting of at least one of (a) reactive halogen-containing vinyl monomer, (b) epoxy group-containing vinyl monomer, (c) carboxyl group-containing vinyl monomer, (d) hydroxyl group-containing vinyl monomer, and (e) amido group-containing vinyl monomer, said acrylic rubber copolymer being vulcanization-bonded to the metal ring except the sliding site along which a mating seal member slides, where the acrylic rubber seal is partially bonded to the metal ring through an adhesive layers, wherein the adhesive layers comprise (a) an underlayer adhesive layer comprising a phenol resin and an epoxy resin, and (b) an overlayer adhesive layer comprising a phenol resin, a halogenated polymer, and a metal oxide, the overlayer adhesive layer being formed from a vulcanizable adhesive composition having a solid matters composition comprising 45-75 wt. % of phenol resin, 5-25 wt. % of halogenated polymer, and 10-30 wt. % of metal oxide on the basis of all the solid matters, wherein the phenol resin is a mixture comprising 50-90% by weight of novolak type phenol resin and 50-10% by weight of resol type phenol resin, on the basis of the phenol resin mixture.

2. A bonded piston seal according to claim 1, wherein the halogenated polymer in the overlaying vulcanizable adhesive composition is a member selected from the group consisting of dichlorobutadiene polymer, brominated dichlorobutadiene polymer, chlorinated polychloroprene, chlorinated rubber and mixtures thereof.

3. A bonded piston seal according to claim 1, wherein the metal oxide in the overlaying vulcanizable adhesive composition is a member selected from the group consisting of titanium oxide, a divalent metal oxide or mixtures thereof.

4. A bonded piston seal according to claim 1, wherein the metal ring is a surface-untreated metal ring.

5. A bonded piston seal according to claim 4, wherein the metal ring is a hot rolled or cold rolled metal ring.

6. A bonded piston seal according to claim 1, wherein the adhesive layer is formed on a rubber bonding site on the surface of the metal ring.

7. A bonded piston seal according to claim 1, wherein the bonded piston seal is a piston seal.

8. A bonded piston seal according to claim 1, wherein the bonded piston seal is a balance dam.

9. A bonded piston seal according to claim 1, wherein the bonded piston seal is a drum seal.

* * * * *